(12) United States Patent
Fitzhardinge

(10) Patent No.: US 10,379,779 B2
(45) Date of Patent: Aug. 13, 2019

(54) CONCURRENT, INCREMENTAL, AND GENERATIONAL MARK AND SWEEP GARBAGE COLLECTION

(71) Applicant: Exablox Corporation, Sunnyvale, CA (US)

(72) Inventor: Jeremy Fitzhardinge, San Francisco, CA (US)

(73) Assignee: Exablox Corporation, Sunnyvale, CA (US)

(*) Notice: Subject to any disclaimer, the term of this patent is extended or adjusted under 35 U.S.C. 154(b) by 344 days.

(21) Appl. No.: 15/240,809

(22) Filed: Aug. 18, 2016

(65) Prior Publication Data

US 2017/0060473 A1  Mar. 2, 2017

Related U.S. Application Data

(60) Provisional application No. 62/209,192, filed on Aug. 24, 2015.

(51) Int. Cl.
| | |
|---|---|
| *G06F 17/30* | (2006.01) |
| *G06F 3/06* | (2006.01) |
| *G06F 16/22* | (2019.01) |
| *G06F 16/23* | (2019.01) |
| *G06F 12/02* | (2006.01) |
| *G06F 16/901* | (2019.01) |
| *G06F 16/11* | (2019.01) |
| *G06F 16/174* | (2019.01) |

(Continued)

(52) U.S. Cl.
CPC ......... *G06F 3/0652* (2013.01); *G06F 3/0608* (2013.01); *G06F 3/0659* (2013.01); *G06F 3/0673* (2013.01); *G06F 12/0269* (2013.01); *G06F 16/10* (2019.01); *G06F 16/128* (2019.01); *G06F 16/174* (2019.01); *G06F 16/1873* (2019.01); *G06F 16/22* (2019.01); *G06F 16/2379* (2019.01); *G06F 16/9024* (2019.01); *G06F 16/9027* (2019.01)

(58) Field of Classification Search
None
See application file for complete search history.

(56) References Cited

U.S. PATENT DOCUMENTS 5,530,846 A * 6/1996 Strong ............... G06F 1/14
                                                  713/400
8,364,642 B1 * 1/2013 Garrod ............ G06F 17/30227
                                                  707/648

(Continued)

*Primary Examiner* — Thu N Nguyen
(74) *Attorney, Agent, or Firm* — Maschoff Brennan

(57) ABSTRACT

Provided are systems and methods for garbage collection of objects in storage. An example method may include providing a monotonically increasing logical clock. Each object is associated with a first number and a second number. The second number is a minimum of the first numbers of objects in a subtree to which the object refers. When the logical clock increases, objects with the first number less than the logical clock from the storage are deleted. When a new object is added to the storage, the first number of the new object is set to a new first number. The new first number is equal to or greater than the logical clock. The first number of each object in a subtree to which the new object is referring is updated. The updated first number is a function of a previous first number and a previous logical clock.

20 Claims, 8 Drawing Sheets

(51) Int. Cl.
*G06F 16/18* (2019.01)
*G06F 16/10* (2019.01)

(56) References Cited

U.S. PATENT DOCUMENTS 8,510,499 B1 * 8/2013 Banerjee ............ G06F 12/0246
711/103
8,886,601 B1 * 11/2014 Landau ............ G06F 17/30575
707/625

* cited by examiner

CONCURRENT, INCREMENTAL, AND GENERATIONAL MARK AND SWEEP GARBAGE COLLECTION

CROSS-REFERENCE TO RELATED APPLICATIONS

The present application claims the priority benefit of U.S. provisional application No. 62/209,192, filed on Aug. 24, 2015. The disclosure of the aforementioned application is incorporated herein by reference for all purposes.

TECHNICAL FIELD

This disclosure relates generally to data processing and, more particularly, to methods and systems for garbage collection.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Computer file systems are usually constructed as objects and references pointing to these objects. The objects are located in an object store. An object may have many references pointing to it; additionally, the object itself can hold references that point to other objects. Thus, typically data is organized as graphs of data objects, and, more specifically, as directed acyclic graphs. In order to effectively utilize resources of various storage devices, it is important to set up a procedure for removing objects that are no longer needed.

Building a file system for an immutable data store may involve eventually deleting and reclaiming storage space associated with obsolete data. Never reclaiming space and just adding new storage as needed is an approach that can also be utilized. This approach has a number of advantages, not least of which is its simplicity. However, this approach is not practical for a commercial product.

Furthermore, extensive use of snapshots (versions of file systems) and deduplication of data involves determining whether a given object is still in use and requires analysis of the full object graph.

A special technique, referred to as garbage collection (GC), can be applied to analyze the object graph to find and remove objects that are no longer referenced by other objects. Some traditional GC techniques use mark and collection techniques to remove the unreferenced objects from the object store and to reclaim the space in a memory, hard disk, or other storage device where the data object store is located.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The technology disclosed herein is related to systems and methods garbage collection of objects in storage. The object may represent a file system. An example method includes providing a logical clock. The logical clock is configured to monotonically increase. The method includes associating each of the objects with a first number. The method allows associating each of the objects with a second number. The second number is a minimum of the first numbers associated with further objects, wherein the further objects belong to a subtree to which the object refers. When the logical clock increases, the method includes deleting objects with the first number less than the logical clock from the storage. When at least one new object is added to the storage, the method includes setting the first number associated with the new object to a new first number, the new first number being equal or greater to the logical clock. The method allows updating the first number of each object in a new subtree to which the new object is referring, the updated first number being a function of the first number associated with each object and a value of the logical clock at which the first number was set.

In some embodiments, the first number of the each object in the new subtree is updated by traversing the new subtree and skipping branches in the new subtree referred to by previous objects with the second number equal or greater than the new first number.

In certain embodiments, the first number is updated by formula UN=SW+2*(FN−SW), wherein UN is the updated first number, FN is the first number, and SW is the value of the logical clock at which the first number was set.

In some embodiments, prior to setting the first number associated with the new object the method includes publishing a reservation number in a consensus store. The reservation number is greater than the logical clock. In certain embodiments, the new first number is greater or equal to the reservation number. In some embodiments, the reservation number is based on maximum of further reservation numbers being published in the consensus store in response to further additions of further objects to the storage.

In some embodiments, increasing of the logical clock is limited by minimum of the published reservation number and the further reservation numbers.

In some embodiments, the method further includes publishing a new root associated with adding the new object to the storage.

In some embodiments, the method allows determining that the new root is published. In response to the determination method includes increasing the logical clock to the minimum of the published reservation number and the further reservation numbers; removing the published reservation number from the consensus store; and updating the first number of each object reachable from the new root.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
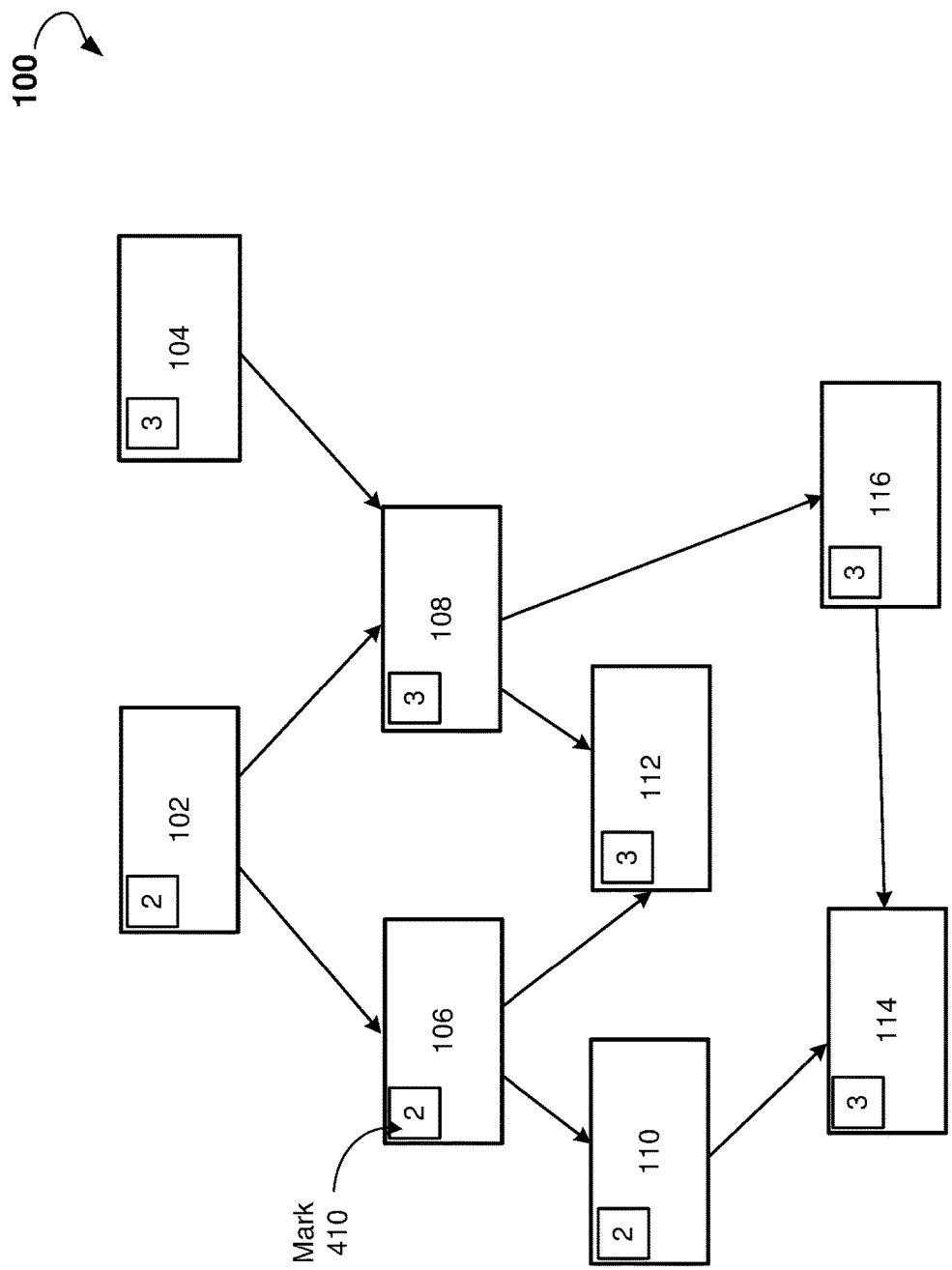
FIG. 1 is a block diagram depicting an example of an object graph representing a file system.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The technology disclosed herein is related to garbage collection in a file system. The file system may be organized as collection of immutable objects in storage, each object representing a piece of a file or directory entry in the file system.

According to an example embodiment of the present disclosure, the method for garbage collection of objects in storage includes providing a logical clock. The logical clock is configured to monotonically increase. The method includes associating each of the objects with a first number. The method allows associating each of the objects with a second number. The second number is a minimum of the first numbers associated with further objects, wherein the further objects belong to a subtree to which the object refers. When the logical clock increases, the method includes deleting objects with the first number less than the logical clock from the storage. When at least one new object is added to the storage, the method includes setting the first number associated with the new object to a new first number, the new first number being equal or greater to the logical clock. The method allows updating the first number of each object in a new subtree to which the new object is referring by traversing the new subtree, the updated first number being a function of the first number associated with each object and a value of the logical clock at which the first number was set. While traversing the new subtree the method allows skipping branches in the new subtree referred to by previous objects with the second number equal or greater than the new first number.

Data Model

In certain embodiments, data of a file system is represented as a graph of data objects. Some data objects can hold pointers to other data objects. At the same time, data objects can be referenced by several other data objects pointing to them. All objects are located in an object store.

FIG. 1 is a block diagram showing an example graph 100 of objects 102-116. The illustrated graph 100 includes two overlapping trees of objects. A first tree starts with a root 102 and a second tree starts with a root 104. The root 102 may correspond to an earlier version of a file system, while the root 104 may correspond to a later version of the file system after a modification to the first version took a place. Each of the objects 102-116 can be attributed with a mark 410. The mark 410 can be used by a GC process to determine old (earlier) objects as candidates for removal from the object store and reclaiming the memory reserved by the old objects in a memory, hard disk(s), and cluster(s).

Garbage Collection System

Figure 2:
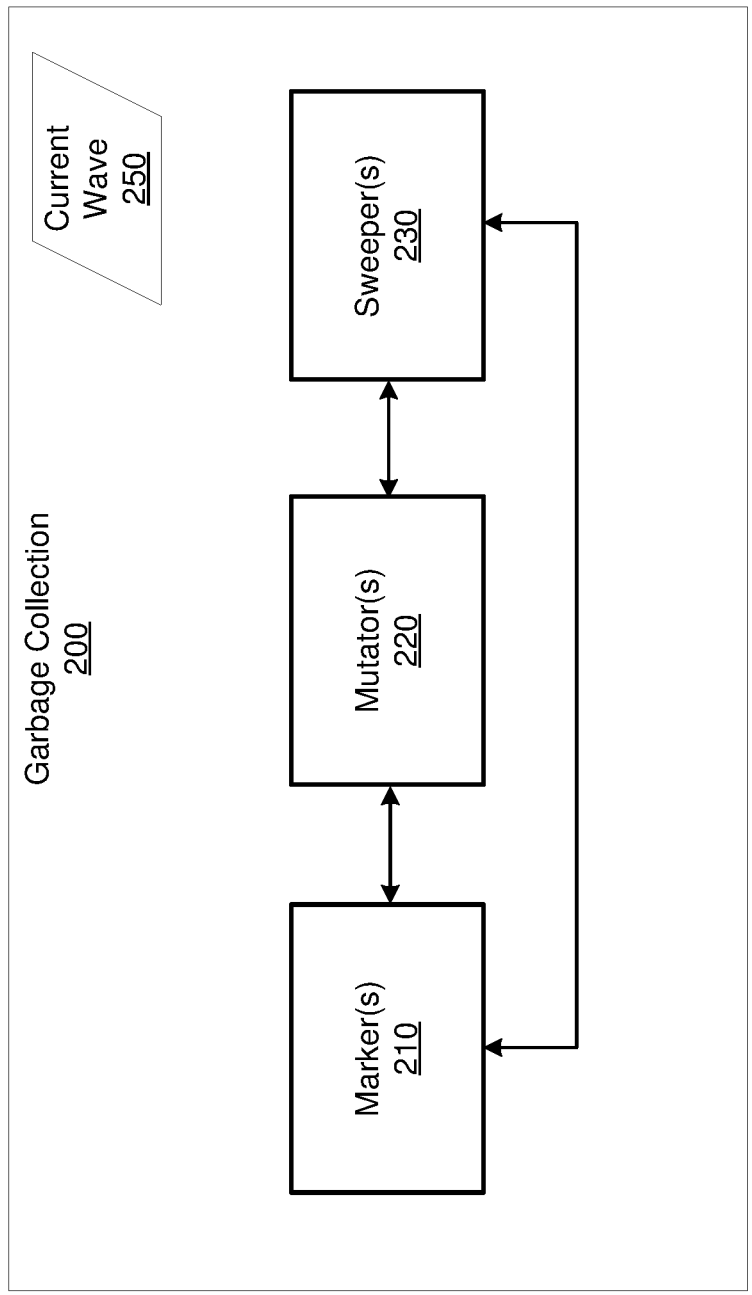
FIG. 2 is a block diagram showing components of a GC system.

FIG. 2 is a block diagram showing components of a GC system 200, according to an example embodiment. The GC system 200 can include at least one marker 210, at least one mutator 220, and at least one sweeper 230. Each of the modules 210, 220, and 230 can interact with the object store substantially independently from the rest. Each of the modules 210, 220, and 230 includes some invariants that the module must maintain, which allows for a wide range of policies to make different operational tradeoffs. The modules 210, 220, and 230 coordinate through a narrow, well-defined interface.

In some embodiments, the GC system 200 includes the following features:

1) concurrent—marker(s) 210, mutator(s) 220, and sweeper(s) 230 are operable to run concurrently with a minimal synchronization;

2) incremental—marker(s) 210 only needs to touch and update objects which differ from the previous mark;

3) generational—recent objects can be partitioned from older ones to take advantage of a generational hypothesis. The generalization hypothesis states that the recent object are most likely candidates to be garbage soon.

Wave

According to various embodiments of present disclosure, a wave is a logical clock which forms a time base for GC systems. The wave is independent from all the other logical clocks (such as snapshots of file system), though it can interact with them.

In some embodiments, a variable 250, also referred to as a current wave 250 can be associated with the GC system 200. In some embodiments, the current wave 250 is a cluster wide agreed value. The current wave 250 can represent the current state of the GC system 200. The current wave 250 may be configured to monotonically increase.

Figure 3:
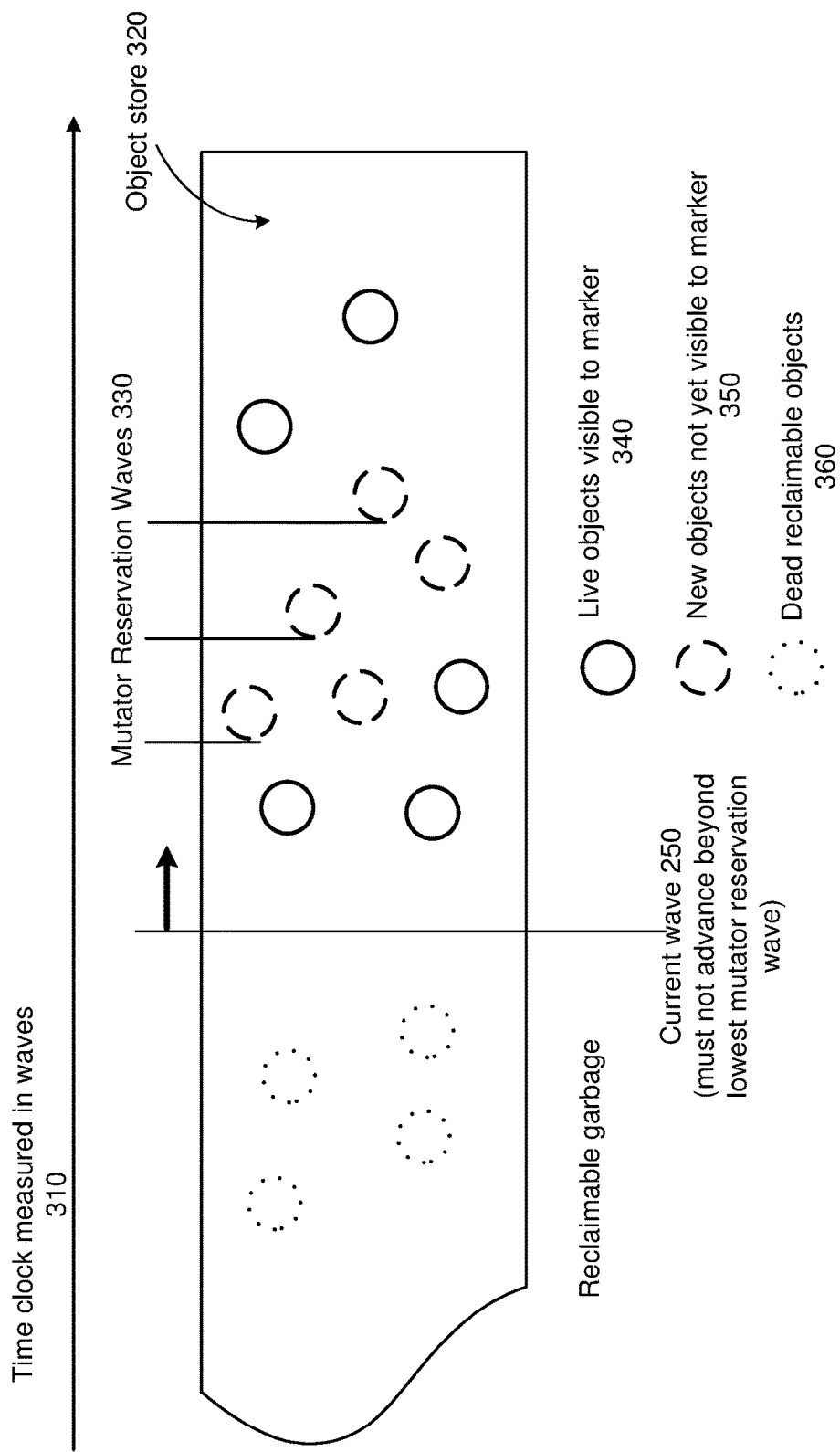
FIG. 3 is schematic representation of a wave time clock and impact of waves on objects in an object store.

FIG. 3 is schematic showing a wave time clock 310 and impact of waves on objects in an object store 320, according to an example embodiment. In some embodiments, the marker(s) 210 traverses an object graph and marks each object in the graph with a wave greater than the current wave 250. The mutator 220 creates new objects with a wave greater than the current wave 250. All of these changes can be published in a cluster consensus store.

According to various embodiments, each object in the object store is marked with a wave (also referred to as a mark or "mark wave"). An object from the object store 320 can be compared with the current wave 250 to determine whether the object is alive. The objects 340 with marks equal or greater than the current wave 250 are considered to be alive. The objects 360 with marks less than the current wave are considered to be dead.

In some embodiments, the mutator 220 publishes a mutator reservation wave 330 that indicates the lower bound of the wave marks of objects 350 not yet visible to the marker 210. The mutator reservation wave 330 represents a mark given to objects as they are written. The mark written by the mutator 220 is greater than current wave 250.

In some embodiments, the current wave 250 represents a primary logical clock for GC system 200. The mutator reservation wave 330 are provided to objects (blocks) as the objects are written. The mutator reservation wave 330 must be greater or equal to the current wave 250 and greater or equal to next wave. Minimal reservation ("minresv") wave is removed once the marker(s) 210 starts running. The minimal reservation wave is needed to protect recently written unmarked objects.

Objects

The term "object" used in the present disclosure refers to the collection of replicas of a specific piece of content-addressable data, where each replica is assumed to have its own independent set of marker/wave metadata. There is no requirement for the replicas of the object to have consistent or coherent metadata. If, however, two or more replicas do share metadata, then there is no problem so long as the "monotonically increasing" invariant is maintained. An expression "set the mark wave on an object" is short for "set the mark wave on all replicas of an object."

Additionally, if a module (for example, a marker 210) requires setting state on a specific replica of an object, but that object does not exist, then it is reasonable to create the object with that state as its initial state. Similarly, if a module cannot find any replicas of an object in the expected places, it can search all possible locations to find it.

Figure 4:
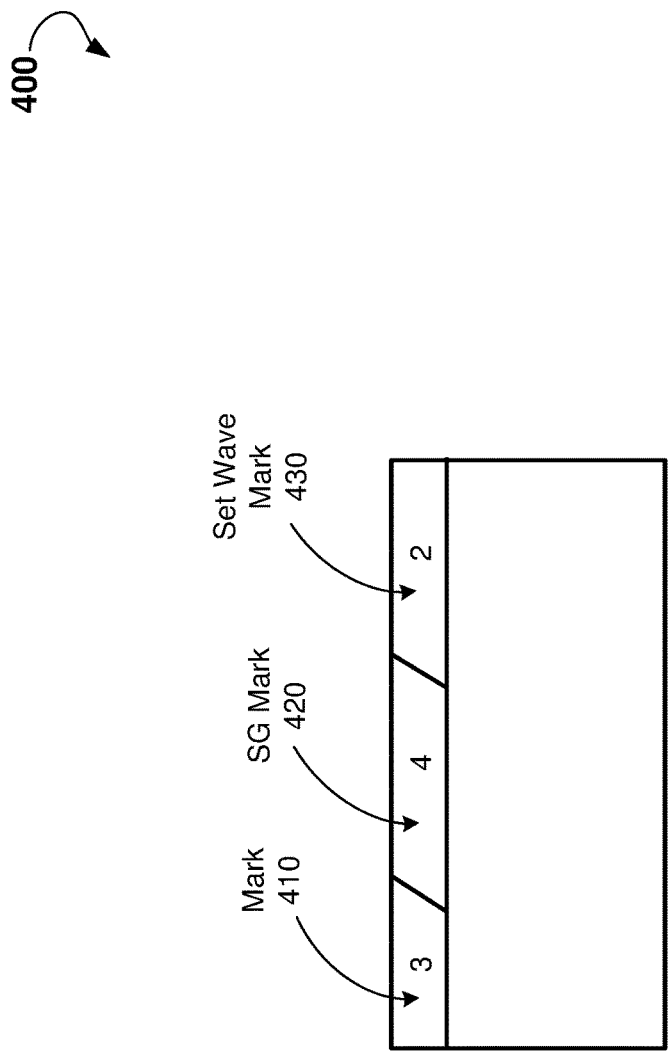
FIG. 4 is a block diagram showing marks associated with an object.

In some embodiments, an object from the object store can be marked with at least three numbers. FIG. 4 is a block diagram of an object 400 and marks thereof. The mark 410 is used by the GC system 200 to determine whether the object is alive. The subgraph (SG) mark 420 is a minimum of marks 410 of child objects to which the object 400 refers to, objects to which the child objects refer to, and so on. In other words, SG mark 420 is the minimum of marks 410 of objects that can be reached by travelling down starting from the object 400. The set wave (SW) mark 430 is set to the value of the current wave 250 at the moment the object 400 is marked. The SW mark 430 can be used to calculate a new value for the mark 410 when marker 210 updates the object.

Figure 5:
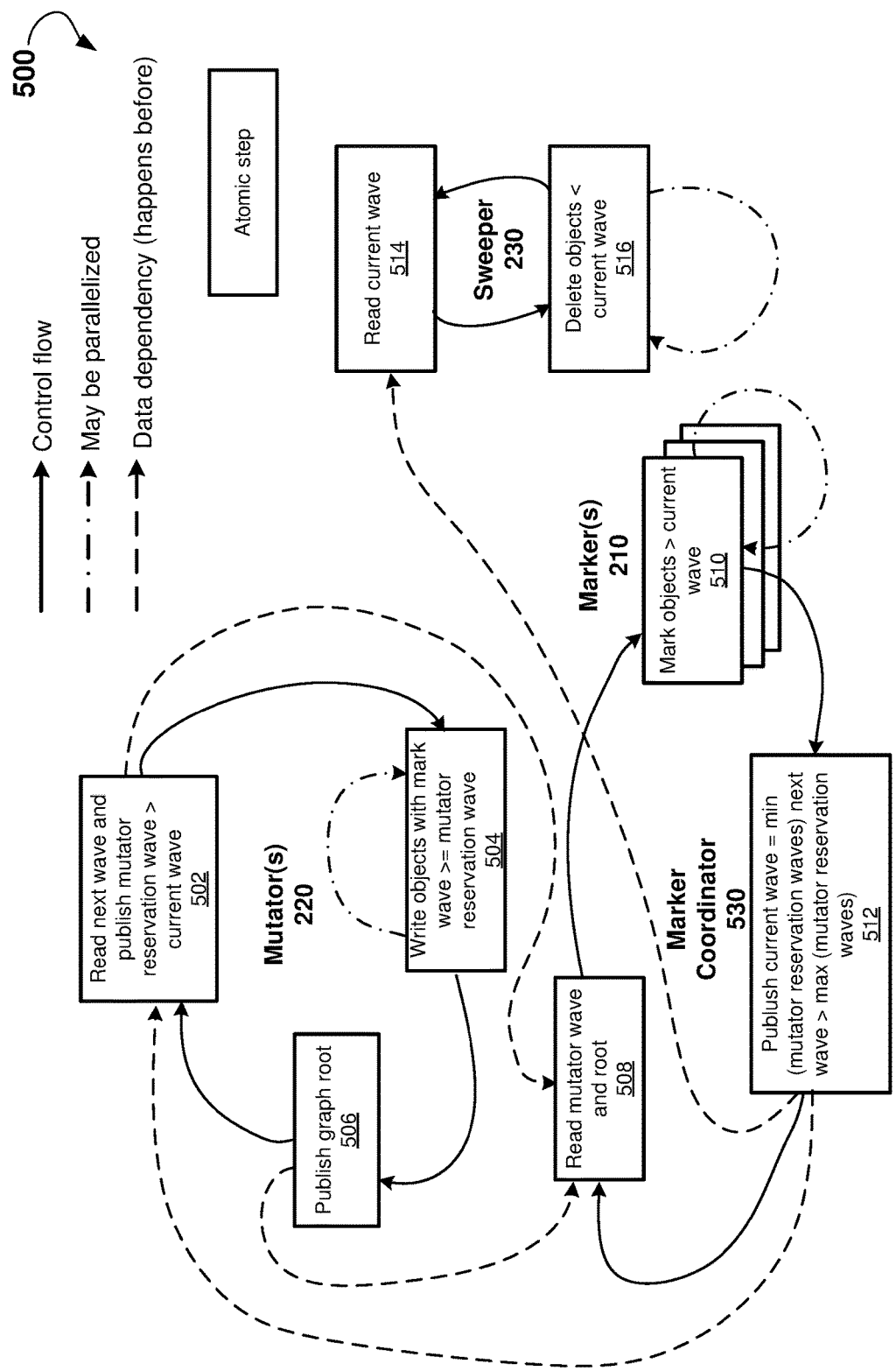
FIG. 5 is a process flow diagram showing interaction of modules of a GC system, according to an example embodiment.

FIG. 5 is a flow chart showing interaction 500 between modules of a GC system, according to an example embodiment. In some embodiments, the modules of the GC system (i.e., marker(s) 210, mutator(s) 220, and sweeper(s) 230 of FIG. 2) are configured to run its own cycle.

Sweeper/Object Storage

In some embodiments, the sweeper(s) 230 is configured to read the current wave 250 in block 514. In block 516, the sweeper(s) is further configured to delete objects with a mark 410 that is less than the current wave 250.

The sweeper(s) 230 is configured to be constrained by the following invariants:

1) the sweeper(s) 230 retain all objects marked with a wave greater than or equal to the current wave; and 2) when receiving an object being written with a given wave, the sweeper(s) 230 either atomically adjust the wave of an existing object or write a new copy of the object with the given wave.

In various embodiments, every individual storage device can run its own independent sweeper(s) 230. The sweeper(s) 230 traverse all the objects present on the storage device and frees the space consumed by any object marked with the sweeper's view of the current wave. The sweeper(s) 230 preserve all objects with a wave greater than or equal to the current wave 250 and may reclaim the rest.

The sweeper(s) 230 may race with the storage of new blocks. If a block is old and is in the process being reclaimed, and a new instance of the same content is written with a new wave, the storage device either prevents the existing object from being reclaimed and update object's marked wave, or write a new copy of the object and allow the old one to be reclaimed.

The sweeper(s) 230 may not consider an object's current wave when responding to a read request. In some embodiments, the read can succeed for an object that has a mark wave less than the current wave. Therefore, a successful object read is not an indication that a device actually has that object stored. The only way to guarantee a device has a copy of an object is to write it with a current mark or successfully set a current mark on an existing object.

Within the constraints of the invariants, the sweeper(s) 230 has wide latitude to implement different policies. One of the policy concerns id the rate at which it scans objects to determine liveness. Storage which is largely empty can just accept writes without needing to worry about freeing space, whereas when the storage approaches fullness it can expend resources on freeing space to apply back-pressure to writers. The sweeper(s) 230 may not need to scan for reclaimable space at all if the sweeper maintains a table that indexes each object by wave, thereby allowing the sweeper directly identify and reclaim space that is reclaimable.

The sweeper(s) 230 may also choose to implement a generational scheme. If objects are written with marks not much beyond the current wave, then it implies they are not expected to have a long lifetime. Such objects can be segregated in a young object region unless and until they survive long enough to be promoted to the main storage pool. This prevents clogging the main storage with objects that end up having a short life.

Device Integration

When a device that was previously used to contain storage but was removed is reintroduced, then there are several options for handling it. If there were no live objects that were only stored on it, then enabling sweeping immediately will have no ill effects.

However, if the device may have the last copy of lost objects on it, then sweeping on that device should probably be disabled until all the objects on the device have been accounted for. In general, this is probably a good idea for any device insertion to accommodate a new device (re-replication of existing objects, etc.) while moving objects around. It would be best to disable the sweeper(s) 230 until it is done so that they do not compete for disk bandwidth.

Mutator

Still referencing to FIG. 5, in block 502, the mutator(s) 220 can be configured to read a next wave and publish a mutator reservation wave 330 larger than the current wave 250. In block 504, the mutator(s) 220 is operable to write objects with a mark wave equal or greater than the mutator reservation wave 330. In block 506, the mutator(s) 220 publishes a graph root.

In various embodiments, the mutator(s) 220 comply to the following invariants:

1) the mutator 220 publishes a mutator reservation wave 330 greater than the current wave 250;

2) the mutator 220 writes all new objects or updates existing objects with a mark wave greater than or equal to its mutator reservation wave; and 3) the mutator 220 only removes its mutator reservation wave after publishing a new object graph root.

In various embodiments, the mutator(s) 220 is an entity that generates new objects and generates garbage in response to client requests. The mutator(s) 220 periodically publishes a hash, which is the root of a graph that the marker 210 can trace to find all referenced objects. Between the publication of these roots, the mutator(s) 220 must make sure that any objects that are not visible to the marker(s) 210 are already marked with a suitably high wave to protect them from the sweeper(s) 230, and that the marker 210 does not advance the current wave beyond this wave.

Therefore, each mutator(s) 220 publishes:

1) its mutator reservation wave, which is the lowest wave with which it tags new objects (though it may choose higher), and therefore sets the lower bound on what current wave the marker can set. The mutator reservation wave is greater than the current wave 250;

2) the object identification (ID) of the most recent root to its object graph, for the marker 210 to start scanning; and 3) the current wave and the next wave, from which the mutator 220 determines the mutator reservation wave. The mutator reservation wave is greater than the current wave and may be influenced by next wave.

It should be noted that an active mutator 220 must always publish a mutator reservation wave, which forms the interlock with the marker 210 to prevent it from advancing the current wave prematurely. If the mutator 220 is no longer writing new objects and no longer needs to keep tracking the current wave (that is, the mutator's last published graph root contains all the objects it cares about), the mutator 220 can remove the mutator reservation wave to prevent it from holding back the marker.

It should be noted, however, that if a reservation is removed while the marker 210 is running, then it is possible that the marker(s) 210 may try to set the current wave 250 to a value beyond the former reservation. However, if the marker 210 does not start from the root containing the objects written under that reservation, it may lead to the objects being improperly reclaimed. To address this issue, whenever a reservation is removed, a "minresv" key is updated to the minimum of its current value and the removed reservation. When the marker 210 is advancing the current wave 250, it is constrained not only by the existing reservations, but also by "minresv", so that unmarked objects are still protected.

If the mutator(s) 220 is required to start writing again, the mutator(s) 220 establishes a new mutator reservation wave before writing anything, and make sure this is visible to the marker(s) 210 (an atomic read-write sequence to read the current wave and write the mutator reservation wave should suffice).

Marker Coordinator and Markers

In some embodiments, the GC system 200 can further include a marker coordinator 530. As shown in FIG. 5, in block 508, the marker coordinator 530 is operable to read a mutator reservation wave and (graph) root. In block 510, the marker 210 is operable to mark objects with a mark wave greater than the current wave 250. In block 512, marker coordinator 530 publishes the current wave 250. The current wave 250 is set to a minimum of mutator reservation waves. The next wave is set to a maximum of mutator reservation waves.

The marker coordinator 530 and marker(s) 210 can comply to the following invariants:

1) keep the current wave 250 at or below the minimum of mutator reservation waves;

2) mark all reachable objects greater than or equal to the next current wave; and 3) monotonically increase the mark wave on an object.

In some embodiments, the marker coordinator 530 is operable to manage the markers 210 for each of the file systems coexisting within the object store 320 and find the conservative minimum of their actions. For each file system, the marker coordinator 530 starts a parallel marker 210 on its published object graph root. When all the marker(s) 210 have finished, the marker coordinator 530 finds the minimum of the published mutator reservation waves, and updates the current wave 250 to match the minimum. The marker coordinator 530 is operable then to wait until at least one file system publishes a new root and starts marking from the new root. The marker coordinator 530 cannot advance the current wave 250 until the minimum mutator reservation wave changes.

In some embodiments, the marker coordinator 530 is required to:

1) atomically read the graph root and mutator reservation wave together;

2) mark from the graph root to update every object's marks to be greater or equal to the current wave 250;

3) advance the current wave 250 to the minimum of all mutator reservation waves at the end of marking and the minimum mutator reservation wave, and set the next wave greater than the current wave as an advisory to mutator(s) 220.

The last is required because while the marker 210 is scanning from the root, the mutator 220 may update the root and mutator reservation wave. However, if the marker coordinator 530 reads the updated mutator reservation wave and updates the current wave accordingly, the marker coordinator 530 will have to violate its invariants as the marker coordinator 530 had not marked from the corresponding graph root.

When marking replicated objects, all replicas of an object are marked. If an object is missing replicas (or they are misplaced), then marking could rewrite them into the correct place. (There is no semantic difference between marking an existing object and writing a new duplicate of it, and very little between marking and writing a new copy except that the mark fails without the data being present.)

Internally, each file system's marker implementation is completely up to the file system. It can be serialized or highly parallelized since, in general, object graph marking is highly parallelizable.

If the marker 210 is operating on a directed graph, and the marker 210 is proceeding in a depth-first post-order fashion, then it can rely on the structural properties of the graph to avoid remarking objects. As the marker 210 traverses down the graph from root to leaf, if it encounters a node which has already been marked with a mark wave greater or equal to the marker's wave, then the marker 210 need not explore that part of the graph any further because it has already been marked. This will avoid revisiting already marked portions of the graph, which is useful if the graph implements deduplication and snapshot deltas by having shared nodes.

The marker's 210 only requirement is that it marks objects with marks 410 greater than the current wave 250. However, the marker 210 can set the object mark waves well beyond current wave+1 if the marker 210 can determine that the object has a long life. For example, if the object is a part of a snapshot with a time-based expiry in the far future, the marker 210 can increase the wave well beyond the current wave 250 to avoid needing to re-traverse that object space. If this estimate is accurate, then the graph need never be re-traversed and can be reclaimed with no further marker effort.

Because the marker 210 visits all objects at least once, and all copies of objects (if using replication for redundancy), it is also in a good position to check that there are enough copies of every object and that they are in the expected places or, more exactly, detect entirely lost objects. Whether or not to overload the marker 210 with these extra duties, or use it as an input to some other mechanism for redundancy management, is entirely an implementation choice.

In some embodiments, the marker coordinator 530 can also publish a "next wave" for the mutator(s) 220 to target when the mutator(s) 220 next update their mutator reservation waves. This allows the marker 210 to indirectly control how quickly the current wave advances, even though it is constrained by the mutator reservation waves. Without the next wave, the mutator(s) 220 will not know what wave to target for their next mutator reservation wave, and will tend to choose something like "current wave+1"; since the marker coordinator cannot advance the current wave beyond the lowest mutator reservation wave, it means that while the system would be correct, it loses flexibility in how quickly the current wave can advance. If the next wave defaults to "max(mutator reservation waves)+1," then it allows all the mutator(s) to write objects with approximately the same waves, but it also allows the flexibility to dramatically advance the current wave. For example, the marker 210 can set the next wave to "current wave+1,000,000" to effectively cause everything to be re-marked in the near term, allowing the GC state of the system to be reset.

As shown in FIG. 5, each of the modules of GC system 200 operates largely autonomously with loose coupling to the other components. The modules have two channels of communication: the marks left on objects and agreed values in the cluster consensus store. The cluster consensus store agreements are strongly ordered and offer transactional semantics, so arbitrary read-modify-write operations can be performed atomically. The marks on objects are very loosely ordered, and the only constraint when updating a given object's mark is that the mark on an object cannot decrease; it can only be the same or increase. However, all object updates must be complete before changing any cluster consensus store keys.

Incrementally Marking an Acyclic Graph

In order to mark an acyclic graph (a Merkle tree) correctly, a second piece of per-object information is required. In some embodiments, the "mark wave" is used by the sweeper(s) 230 to determine object liveness, and so is the output of the marking phase. However, a second value is required in order to make incremental marking work properly in the face of modifications that the mutator 220 is making to the graph.

Figure 6:
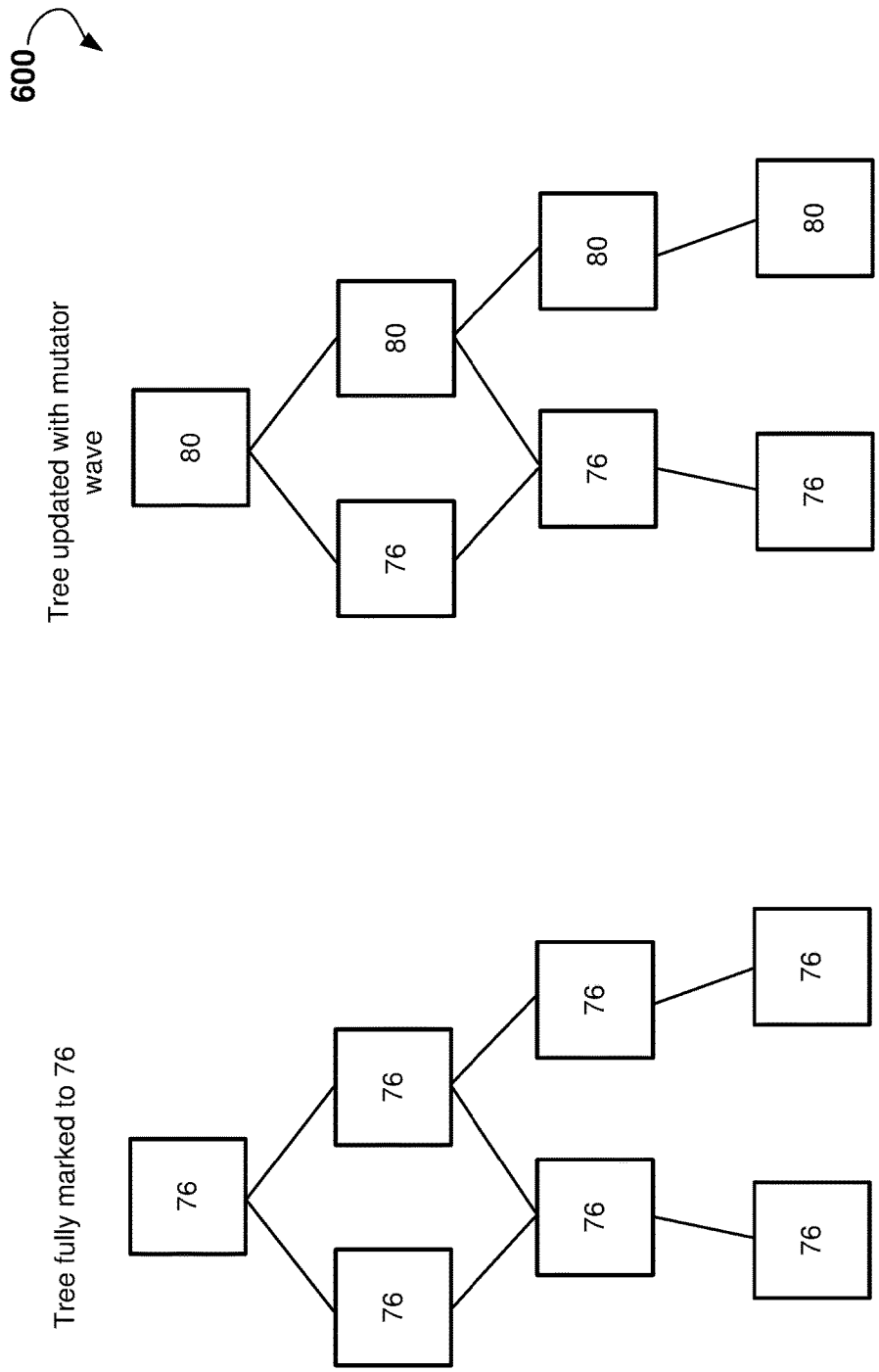
FIG. 6 is a block diagram showing an example object tree and an object tree updated with a mutator wave.

FIG. 6 is a block diagram showing an example graph 600 with a single mark wave per object. The mutator 220 generates a new version of the tree (shown on the right) by writing new objects for a portion of the tree and giving them a mark wave of 80. If the marker 210 comes to a mark tree with a mark of less than or equal to 80, it would stop as soon as it saw the 80 on the root node and leave the remaining wave 76 nodes unmarked, resulting in the sweeper(s) 230 reclaiming them too early. This results from a violation of the invariant that a node with mark wave W should never point to a node with a mark wave less than W.

However, maintaining this invariant with a single per-object wave number is impractical, as it implies that every write of a pointer-containing object also updates the waves on every object in the subgraphs it refers to.

To solve this problem, a second per-object value, the subgraph (SG) wave 420 (also shown in FIG. 4), is introduced. The subgraph wave 420 is the conservative estimate of the minimum mark wave of all objects in a pointer-containing object's subgraph. With this, the mark wave is still used for liveness decisions on the object itself, but the subgraph wave 420 can be used to guide the marker 210 through the graph. The subgraph wave 420 is purely for the marker's internal accounting and is not examined by any of the other GC modules.

Figure 7:
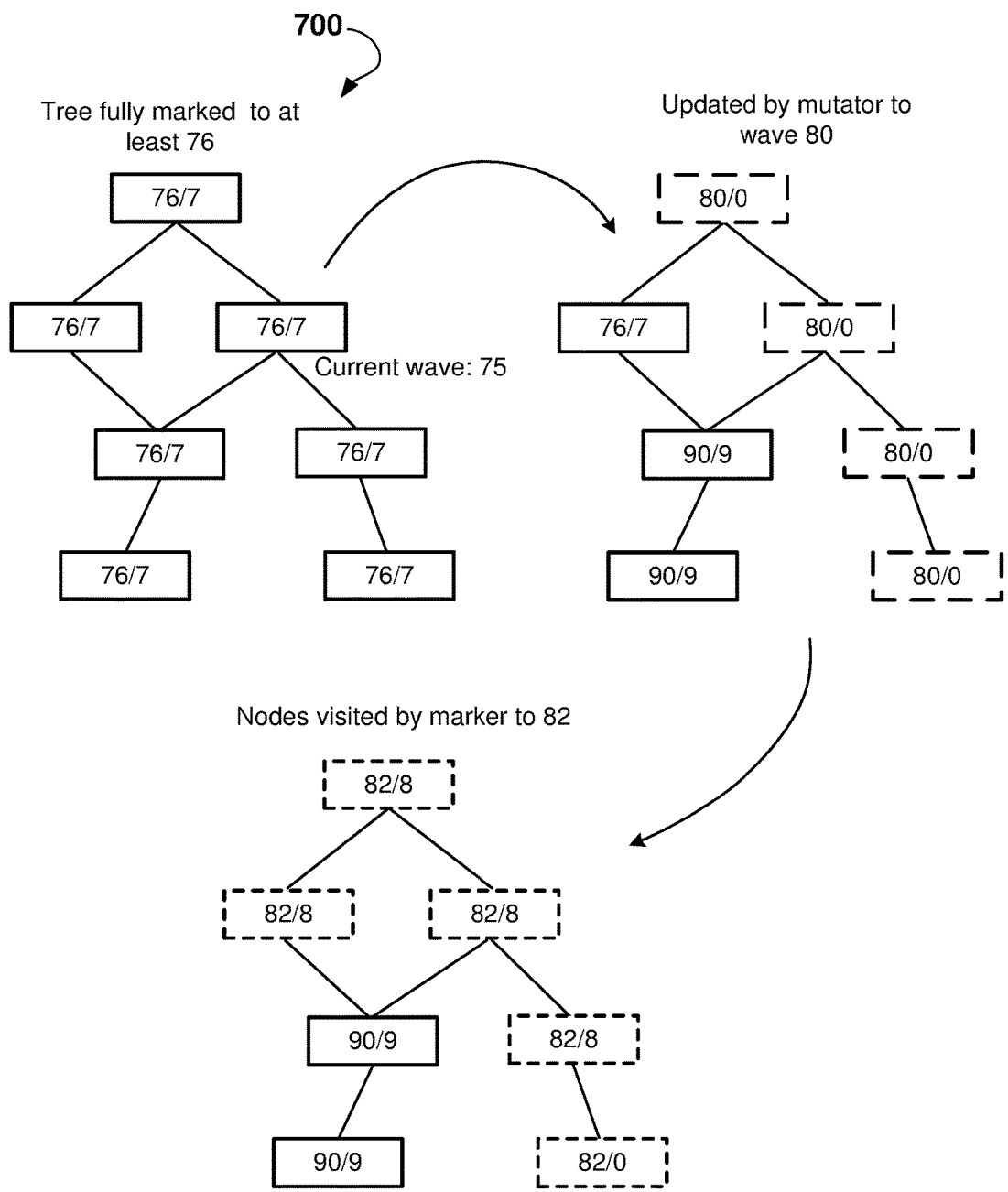
FIG. 7 is a block diagram showing an example object tree, an object tree updated by a mutator wave, and an object tree updated with a marker.

FIG. 7 is a block diagram of an example graph 700 where nodes are labeled with the mark wave 410 and the subgraph wave 420 ("mark wave|subgraph wave"). The graph is updated first with mutator wave 80 (result is shown on right) and then nodes of the graph are visited by a marker (result shown on the bottom). The newly written nodes are written with mark wave 80 which is above the current wave (76), and a conservative minimum of the subgraph wave of 0. When the marker comes through to mark to wave 82, it visits all the nodes that have a mark wave of less than 82, via the nodes with a subgraph wave of less than 82. When the marker encounters a subgraph that has already been marked with wave 90, it can avoid it entirely. Setting an object's subgraph wave does not actually require inspecting any of the waves in the subgraph. If a particular wave W is marked and the marker has completed the subgraph under an object, it can mark the object with subgraph wave W since it knows all of the subgraph objects have at least that wave.

This approach requires that each node containing pointers has only one interpretation. That is, there are no alternative interpretations of the same bit pattern that contains a separate set of subgraph objects. This allows having a single subgraph field. In practice this is easy to arrange. If every pointer-carrying object has a unique magic number that can be used to identify its format, then it also guarantees that two different formats cannot have the same bitwise content.

Leaf nodes are excluded from this consideration, since they do not have any pointers to other objects by definition. In their case, the marker ignores the subgraph field; it does not examine it and it does not modify it. This is important in case a leaf node does have the same bit pattern as a pointer-carrying node (for example, storing a file system image within a file system); in this case, the node is visited twice by the marker as both a pointer-carrying and leaf object.

In general, a lot of shared portions of the object graph can be expected as a result of snapshot generation. This scheme means that even without amortized marking (described below), the incremental cost of marking a snapshot is proportional to its difference from other snapshots, rather than its total size.

Amortized Marking

The marker(s) 210 have a lower bound mark wave that they must apply to each object in order to maintain their invariants. If all markers 210 always applied the lower bound mark, then they would visit every live object on every mark phase. With this simple approach, the cost of each marking phase is O(n) (wherein n is number of objects) and overall O(nm) for objects which survive m marking phases.

Applying a mark wave beyond the lower bound has the effect of deferring any further marking to an object and its subgraph, which amortizes the cost of doing the mark. For example, if a subgraph of objects represents a snapshot with a timed expiry point in the far future, then all of those objects can be marked with a mark wave well beyond the current wave. Ideally, the mark wave is extrapolated from how quickly the current wave is advancing to estimate what it will be at the time of expiry. If done accurately, it means that a subgraph is marked only once, and all of the objects become reclaimable garbage at the time they expire. Getting this estimate wrong does not cause any correctness problems, just inefficiencies: too low, and the subgraph needs to be marked again, too high and the objects are retained too long.

In various embodiments, marking is policy driven and can be amortized by making use of application-specific knowledge, user/programmatic input, storage use projections, and the like.

Geometric Series Amortized Marking

In other embodiments, a strategy for amortized marking includes use of a geometric series marking scheme. If an object is written with a mark wave of current wave+1, and then every time it is revisited it is marked with a doubling pattern, then in effect the object will be marked once, then after two phases, then four, and so on:

1+½+¼+⅛+ . . .

This series converges to 2. That is, the number of mark passes to keep an object graph alive using this technique is O(1), independent of how long the graph is alive (O(n) the number of objects). It should be noted that the first mark is "free" as it happens when the object is written, so the series of subsequent marks sums to one additional marking pass.

The obvious downside of geometric series marking scheme is that each time the object is marked with a doubled wave, the object's lifetime is doubled. If the object has an apparently unbounded life anyway then this does not cause any problems, but if the object would have expired within that time then it will be retained unnecessarily. Determining whether this is a problem depends on how object lifetimes are distributed in practice: if an object has been alive for time N, what is the likelihood it will live for an additional 2N time?

Mark Scheduling

Each cycle of marking the object graph and advancing the current wave 250 is known as a mark phase. Because the sweeper(s) 230 can only release objects that are marked before the current wave, they cannot work until the current wave 250 advances. If marking takes a long time, then there is a long latency before any storage can be released. Eventually the same number of blocks will be released and the throughput is good on average, but it leads to a lumpy effect.

To address this issue, some embodiments can smooth out the amount of marking work that needs to be performed at any one phase in advance. When deciding what wave to mark a set of objects with, some embodiments can choose a wave that is distinct from waves used to mark other objects. If those objects are still reachable in the object graph when they come up for re-marking, the marker 210 will only need to expend effort on that subset and then mark other objects in another phase.

This makes each mark phase a bounded amount of work, and it keeps the current wave advancing at a steady rate, giving the sweeper(s) (230) a continuous stream of reclaimable storage (assuming there is anything being released at all).

Consensus Data Model

In some embodiments, all keys used by the various modules of the GC system 200 to communicate state with each other are stored.

Example GC keys (flags) are presented in following table:

| | | |
|---|---|---|
| gc/ | | root of all gc state |
| gc/currentwave | u64 | current wave |
| gc/nextwave | u64 | target wave for next mutator reservation wave |
| gc/minresv | u64 | min of reservations removed since marking started |
| gc/sweepenabled | bool | sweeping enabled (best effort) |
| gc/markenabled | bool | marking enabled (best effort) |
| gc/mutator/fsid/ | | per-mutator state; fsid is Smash |
| gc/mutator/fsid/mutatorwave | u64 | mutator reservation wave >= current wave |
| gc/mutator/fsid/graphroot | smash | root of object graph |
| filesystems/fsid/metaroot | smash | current metaroot for fsid |
| filesystems/fsid/markwave | u64 | currently marking with this wave, >= gc/mutator/fsid/mutatorwave |

The requirements on consensus are that it is possible to read multiple keys atomically and then update, and have that atomically succeed or fail without side-effects. It does not require that all members immediately see updates, and it is always correct for them to continue operating on old values of each key. Specifically, clearing the "markingenabled" or "sweepingenabled" flags cannot be assumed to atomically disable marking/sweeping. Instead marking/sweeping will cease once all the markers/sweepers have had an opportunity to observe the current state of the flag.

Smashfs Particulars

While the basic GC system 200 can be agnostic to the file systems and data models being used, it may be worth exploring how a file system will work in specific details.

Snapshots and Metaroot

Each file system instance in the object store has a metaroot. The metaroot is the root of the tree that points to all snapshot roots. Therefore a pointer to a specific metaroot object fully describes the total state of the file system that is all the snapshots that exist and all their contents (where the live current state of the file system is simply the most recent snapshot).

The metaroot is a singleton object for each file system. Only one metaroot exists at one time and once a new metaroot has been agreed for a file system, the previous one becomes garbage. However, it is expected that most data in the file system will remain unchanged from snapshot to snapshot.

Snapshot Lifetime Model

Time-Based

In some embodiments, each smashfs instance has a snapshot policy, which is purely time-based: a snapshot which exists for a range of time which covers particular time boundary will be preserved for a period of time as a function of that boundary. For example, a snapshot which spans a minute boundary might be kept for an hour, and a snapshot that spans an hour boundary might be preserved for a day. This is associated with the snapshot as its expiry time.

The expiry time determines when the snapshot ceases to be visible to new users. However, if it expires while there's a current active user of the snapshot, then the entire snapshot is preserved until they finish using it. This means that the snapshot can be kept alive indefinitely beyond its expiration time.

Non-Time-Based

In other embodiments, the snapshots are not non-time-based snapshots. The non-time-based snapshots are created explicitly, either by user action or programmatically, and may never expire, or only under a wide range of possible policy conditions. These snapshots do not have an expiration time per-se, but still have an expired state that prevents new users while allowing existing users to remain.

In some ways this is a generalization of how the time-based model treats the last snapshot, representing the live file system state. It can never expire until it is replaced with a newer live file system snapshot.

Metaroot Implementation

Each snapshot can be represented as an entry in the metaroot. The entry may have a key. The key can include a snapid encoded as be64. In some embodiments, the keyspace may be extended to accommodate other indices). The entry contains:

| Name | Type | Description |
| --- | --- | --- |
| root | Smash | Root of snapshot graph |
| type | be32 - magic | Magic number indicating the datamodel of the graph. (Typically just for big changes; the datamodel of the graph itself should be fairly self-describing.) |
| live | u8 - bool | True if the snapshot is live and available for use; false if snapshot should still be marked but not accessible to new users (see below) |
| timestamp | be64 - time | Time snapshot was created |
| policy | be32 - magic | Expiration policy to be applied to snapshot |
| | currentfs | Live filesystem snapshot. Always a singleton, always last created snapshot, always replaced by existing snapshot, always live = true. No policydata. |
| | time-based | Time-based expiration. Policydata contains: exptime: be32 |
| | user | Created explicitly. Only expired manually. Named; name stored in policydata |
| policy data | policy-dependent | |

Live is a flag that indicates whether this snapshot is still visible to new users. A snapshot is created with live=true, but once it is expired via whatever policy applies to it, live is set to false that prevents new users. However, the snapshot still exists in the metaroot so that it is visible to the markers until it is removed altogether when the last active user finishes. Any non-live entries in the metaroot can be removed on cluster startup, since there are no active users by definition (at least until we implement persistent file handles, but they would probably be visible to the marker too).

File System Data Model

There are two data models to consider for the snapshot acyclic graph. Snapshots can share common sub-trees. The markers can take advantage of this property to avoid re-marking.

Namespace Merkle Tree

Each snapshot is a Merkle tree which is based on the file system namespace. The root node is the root directory. The directory including entries. Each entry in the directory consists of a (name, inum, inode hash) tuple. The only component of this which is relevant to the marker 210 is the inode hash.

Each inode includes further hashes, the xhash and the chash. xhash refers to the file's extended attributes, and chash either refers directly to the file's data (for small files), or to the root of a Merkle tree over the file's content, implicitly indexed by file offset. In the case of directory inodes, the chash refers to directory blocks which, in turn, refer to more file and directory inodes. This means that marking a single non-empty file takes at least 3 object accesses.

Btree Smashfs

Btree Smashfs (see "Smashfs in a B+ Merkle Tree") is a full Merkle tree (as any tree structure built in an immutable content-addressable store must be).

B+tree nodes are stored 1:1 in the object storage, so the terms node and object can be used interchangeably in this context. Unlike the namespace Merkle tree, the B+tree depth is bounded to approximately O(log n), wherein n is the number of nodes in the tree. There are also fewer nodes (=objects) to mark, because many small file system entities are packed together into B+tree nodes.

The basic marking algorithm is the same as with the namespace Merkle, but there are fewer distinct cases to deal with. The core of the marking is enumerating all the objects within the B+tree itself, and then marking any external references the data items in the leaves of the B+tree have to other objects (namely, parts of files too large to inline into the tree, and large xattrs).

This means that many filesystem entities are marked with each object mark, and using recursive marking is safe because the tree depth is bounded. Also, because the B+tree is a broad shallow tree, it means that skipping already marked portions of the tree is very effective.

Figure 8:
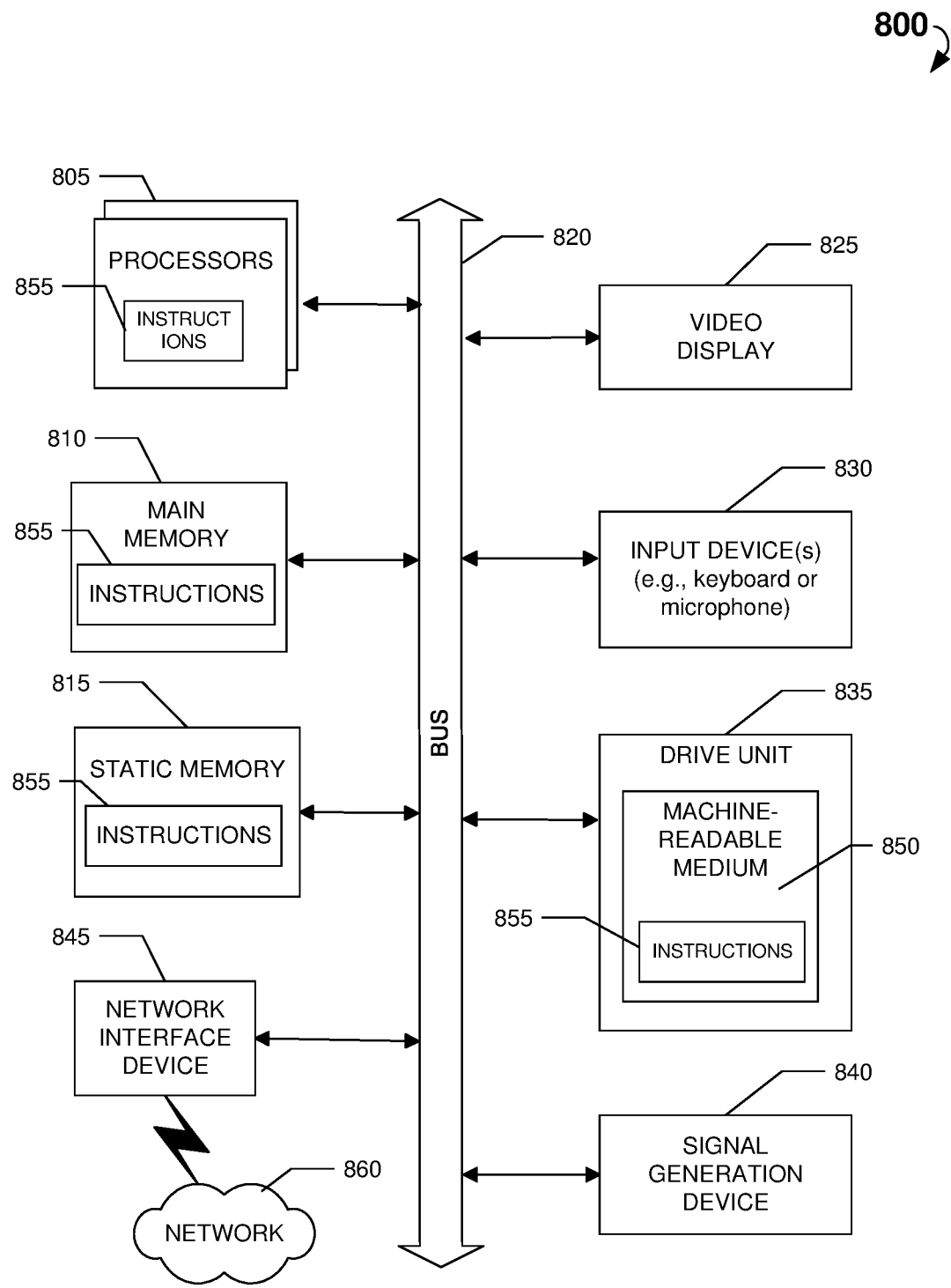
FIG. 8 shows a diagrammatic representation of a computing device for a machine in the example electronic form of a computer system, within which a set of instructions for causing the machine to perform any one or more of the methodologies discussed herein can be executed.

FIG. 8 shows a diagrammatic representation of a computing device for a machine in the example electronic form of a computer system 800, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant, a cellular telephone, a portable music player (e.g., a portable hard drive audio device, such as an Moving Picture Experts Group Audio Layer 3 (MP3) player), gaming pad, portable gaming console, in-vehicle computer, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors 805 (e.g., a central processing unit (CPU), a graphics processing unit (GPU), or both), and a main memory 810 and a static memory 815, which communicate with each other via a bus 820. The computer system 800 can further include a video display unit 825 (e.g., a liquid crystal display). The computer system 800 can also include at least one input device 830, such as an alphanumeric input device (e.g., a keyboard), a cursor control device (e.g., a mouse), a microphone, a digital camera, a video camera, and so forth. The computer system 800 also includes a disk drive unit 835, a signal generation device 840 (e.g., a speaker), and a network interface device 845.

The disk drive unit 835 includes a computer-readable medium 850, which stores one or more sets of instructions and data structures (e.g., instructions 855) embodying or utilized by any one or more of the methodologies or functions described herein. The instructions 855 can also reside, completely or at least partially, within the main memory 810 and/or within the processors 805 during execution thereof by the computer system 800. The main memory 810 and the processors 805 also constitute machine-readable media.

The instructions 855 can further be transmitted or received over a network 860 via the network interface device 845 utilizing any one of a number of well-known transfer protocols (e.g., Hyper Text Transfer Protocol (HTTP), CAN, Serial, and Modbus). For example, the network 860 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

While the computer-readable medium 850 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, a technique for marking objects for garbage collection of objects in a storage is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for garbage collection of objects in a computer storage, the method comprising:
   providing a logical clock, the logical clock being configured to monotonically increase a current wave value;
   organizing each of the objects into a directed acyclic graph;
   associating each of the objects with a mark wave number;
   associating each of the objects with a subgraph wave number, the subgraph wave number being a minimum of the mark wave numbers associated with other objects in the directed acyclic graph to which the object refers;
   when the logical clock increases the current wave value:
      deleting, from the computer storage, objects in the directed acyclic graph with the mark wave number less than the current wave value of the logical clock; and
   when at least one new object is added to the directed acyclic graph in the computer storage:
      setting the mark wave number associated with the at least one new object to a new mark wave number, the new mark wave number being equal to or greater than the current wave value of the logical clock; and
      updating the mark wave number of each object in a new subgraph of the directed acyclic graph to which the at least one new object refers, the updated mark wave number being a function of the mark wave number associated with each object and the current wave value of the logical clock at which the mark wave number was set.

2. The method of claim 1, wherein the mark wave number of each object in the new subgraph is updated by traversing the new subgraph and skipping branches in the new subgraph referred to by previous objects with the subgraph wave number equal to or greater than the new mark wave number.

3. The method of claim 1, wherein updating the mark wave number is defined by a formula $UN=SW+2*(FN-SW)$, wherein UN is the updated mark wave number, FN is the mark wave number, and SW is the current wave value of the logical clock at which the mark wave number was set.

4. The method of claim 1, further comprising prior to setting the mark wave number, publishing a reservation number in a consensus store, the reservation number being greater than the current wave value of the logical clock.

5. The method of claim 4, wherein the new mark wave number is greater than or equal to the reservation number.

6. The method of claim 4, wherein the reservation number is based on a maximum of further reservation numbers being published in the consensus store in response to further additions of objects to the directed acyclic graph in the computer storage.

7. The method of claim 5, wherein increasing of the current wave value of the logical clock is limited by a minimum of the published reservation number and the further reservation numbers.

8. The method of claim 4, further comprising publishing a new root associated with the adding of the at least one new object to the directed acyclic graph in the computer storage.

9. The method of claim 8, further comprising determining that the new root is published, and in response to the determination:
   increasing the current wave value of the logical clock to the minimum of the published reservation number and the further reservation numbers; and
   updating the mark wave number of each object reachable from the new root.

10. The method of claim 8, further comprising removing the published reservation number from the consensus store.

11. A system for garbage collection of objects in a computer storage, the system comprising:
   at least one processor; and
   a memory communicatively coupled to the at least one processor, the memory storing instructions, which, when executed by the at least one processor, perform a method comprising:
      providing a logical clock, the logical clock being configured to monotonically increase a current wave value;
      organizing each of the objects into a directed acyclic graph;
      associating each of the objects with a mark wave number;
      associating each of the objects with a subgraph wave number, the subgraph wave number being a minimum of the mark wave numbers associated with other objects in the directed acyclic graph to which the object refers;
      when the logical clock increases the current wave value:
         deleting, from the computer storage, objects in the directed acyclic graph with the mark wave number less than the current wave value of the logical clock; and
      when at least one new object is added to the directed acyclic graph in the computer storage:
         setting the mark wave number associated with the at least one new object to a new mark wave number, the new mark wave number being equal to or greater than the current wave value of the logical clock; and
         updating the mark wave number of each object in a new subgraph of the directed acyclic graph to which the at least one new object refers, the updated mark wave number being a function of the mark wave number associated with each object and the current wave value of the logical clock at which the mark wave number was set.

12. The system of claim 11, wherein the mark wave number of each object in the new subgraph is updated by traversing the new subgraph and skipping branches in the new subgraph referred to by previous objects with the subgraph wave number equal to or greater than the new mark wave number.

13. The system of claim 11, wherein updating the mark wave number is defined by a formula $UN=SW+2*(FN-SW)$, wherein UN is the updated mark wave number, FN is the mark wave number, and SW is the current wave value of the logical clock at which the mark wave number was set.

14. The system of claim 11, wherein the method further comprises prior to setting the mark wave number publishing a reservation number in a consensus store, the reservation number being greater than the current wave value of the logical clock.

15. The system of claim 14, wherein the new mark wave number is greater than or equal to the reservation number.

16. The system of claim 14, wherein the reservation number is based on a maximum of further reservation numbers being published in the consensus store in response to further additions of objects to the directed acyclic graph in the computer storage.

17. The system of claim 15, wherein increasing of the current wave value of the logical clock is limited by a minimum of the published reservation number and the further reservation numbers.

18. The system of claim 14, wherein the method further comprises publishing a new root associated with the adding of the at least one new object to the directed acyclic graph in the computer storage.

19. The method of claim 8, wherein the method further comprises determining that the new root is published, and in response to the determination:
- increasing the current wave value of the logical clock to the minimum of the published reservation number and the further reservation numbers;
- removing the published reservation number from the consensus store; and
- updating the mark wave number of each object reachable from the new root.

20. A non-transitory computer-readable storage medium having embodied thereon instructions, which, when executed by one or more processors, perform a method for garbage collection of objects in a computer storage, the method comprising:
- providing a logical clock, the logical clock being configured to monotonically increase a current wave value;
- organizing each of the objects into a directed acyclic graph;
- associating each of the objects with a mark wave number;
- associating each of the objects with a subgraph wave number, the subgraph wave number being a minimum of the mark wave numbers associated with other objects in the directed acyclic graph to which the object refers;
- when the logical clock increases the current wave value:
  - deleting, from the computer storage, objects in the directed acyclic graph with the mark wave number less than the current wave value of the logical clock; and
- when at least one new object is added to the directed acyclic graph in the computer storage:
  - setting the mark wave number associated with the at least one new object to a new mark wave number, the new mark wave number being equal to or greater than the current wave value of the logical clock; and
  - updating the mark wave number of each object in a new subgraph of the directed acyclic graph to which the at least one new object refers, the updated mark wave number being a function of the mark wave number associated with each object and the current wave value of the logical clock at which the mark wave number was set.

* * * * *